United States Patent [19]

Teraoka et al.

[11] Patent Number: 4,690,258
[45] Date of Patent: Sep. 1, 1987

[54] HYDRAULIC POWER TRANSMISSION DEVICE WITH CENTRIFUGALLY ACTUATED CLUTCH OVERRIDE

[75] Inventors: Masao Teraoka, Sano; Yukio Yuhashi, Kitasaitama, both of Japan

[73] Assignee: Tochigifujisangyo Kabushikigaisha, Tochigi, Japan

[21] Appl. No.: 867,336

[22] Filed: May 23, 1986

[30] Foreign Application Priority Data

May 27, 1985 [JP] Japan ............................ 60-112138
Apr. 10, 1986 [JP] Japan ............................ 61-81127

[51] Int. Cl.⁴ .................... F16D 37/00; F16D 19/00
[52] U.S. Cl. .................................. 192/58 C; 192/52; 192/70.23; 192/93 A
[58] Field of Search ............... 192/58 B, 58 C, 48.1, 192/48.3, 48.7, 5, 59, 70.23, 83, 87.12, 93 A, 103 A, 103 B, 105 B, 105 CP

[56] References Cited

U.S. PATENT DOCUMENTS

| | | | |
|---|---|---|---|
| 2,684,743 | 7/1954 | Trofimov | 192/58 C |
| 2,714,946 | 8/1955 | Tenot et al. | 192/58 C |
| 3,404,585 | 10/1968 | Roper | 192/58 C |
| 3,536,173 | 10/1970 | Merkert et al. | 192/58 C |
| 4,031,780 | 6/1977 | Dolan et al. | 192/58 C |
| 4,058,027 | 11/1977 | Webb | 192/58 C |

Primary Examiner—George H. Krizmanich
Attorney, Agent, or Firm—Maurice E. Gauthier

[57] ABSTRACT

A hydraulic power transmission device of the viscous shear type provides a rotatable driving connection between first and second shaft assemblies. A centrifugal clutch is interposed between the shaft assemblies to provide an overriding rotatable driving connection therebetween when the angular velocity of the first shaft assembly exceeds a predetermined level.

5 Claims, 10 Drawing Figures

HYDRAULIC POWER TRANSMISSION DEVICE WITH CENTRIFUGALLY ACTUATED CLUTCH OVERRIDE

BACKGROUND OF THE INVENTION

1. Field of the Invention

The present invention relates to a vehicular power transmission device which utilizes the viscous resistance of a fluid.

2. Description of the Related Art

In an automobile with an all-wheel drive system of the type in which the wheels on the front axle are usually driven, an automatic power transmission device is known as shown in Japanese Publication of Unexamined Utility Model Application No. 59-188731 which relies on the fact that the front wheel axle and the rear wheel axle are usually mutually connected in an almost rigid manner based on the torque with a viscous clutch which is positioned between the front wheel axle and the rear wheel axle in the drive system thereby driving the wheels on the rear axle.

Where there is a slight difference in RPM between the input shaft and the output shaft, the viscous clutch transmits only an extremely small torque. In contrast, when there is a large difference in RPM, the viscous clutch has the function of transmitting an extremely large torque.

In such a conventional power transmission device, a flange is provided on one end of an input shaft. A bearing hole is formed on the centerline section of the input shaft in the axial direction to support the tip of an output shaft. One side of a cylindrical outer tube engages the outer periphery of the flange and after engaging, the two are integrally connected at the external peripheral ends by a welded section.

A plurality of channels (for example, channels for receiving a spline) are provided parallel to the centerline on the inner circumferential surface of the cylindrical outer tube. A plurality of teeth (for example, teeth for receiving a spline) equivalent in number to the number of channels are provided on the outer peripheries of a plurality of input shaft clutch plates, which act as resistance plates inserted into the channels. These teeth are slidably fitted in the channels which are provided on the outer tube. A hollow portion with a slightly large diameter is formed in the center section of the input shaft clutch plate in such a way that it does not contact the outer periphery of an output shaft.

The input shaft clutch plates are mutually assembled with a plurality of output shaft clutch plates with a prescribed gap therebetween. The assembly maintains the gap as set by a stopper and a maintaining plate which is provided at the distal edge of the assembly.

A stopper for preventing the separation of the outer tube of the input shaft from the output shaft, is mounted as a ring on the tip of the outer tube.

In such a conventional power transmission device as mentioned above, the input shaft clutch plate, which is provided on the input shaft for the transmission of power, transmits its rotational power to the output shaft clutch plate through the highly viscous fluid which is sealed into the section chamber to provide for the production of rotation in the output shaft, wherein the phenomenon of tight corner braking at low speeds of the output shaft can be prevented from occurring. However, because the power is transmitted through a viscous fluid, slipping is always produced between the clutch plates and the viscous fluid, and the viscous fluid heats up because of this slipping, lowering the viscosity of the fluid. This in turn lowers the transmission limit torque.

As a result, a waste of power transmission is produced, which prevents the automobile from running smoothly.

In addition, as a conventional power transmission device of this type, there is also a device as described in the Japanese Patent Publication of Examined Application No. 58-48779.

In this device, when there is a difference in the rotation between the front and rear wheels, a resistance plate rotates in a viscous fluid filled into a sealed action chamber, utilizing the viscous resistance to transmit the power. However, when the rotational differential continues, the temperature of the action chamber rises, causing its pressure to rise, so that a piston activated by this pressure moves in the axial direction, causing an outer clutch mechanism to engage so that the differential is removed and the temperature raise is restrained.

However, with such a conventional device, the durability of the seal member is reduced because the differential is removed by the movement of the piston resulting from the rise in pressure in the differential chamber to prevent a rise in temperature. This is because the internal pressure itself must be maintained at a substantially higher level to obtain engaging or clamping power by means of the internal pressure rise. In addition, when the differential is removed with the internal pressure dropped by lowering the temperature, the engagement of the clutch mechanism is released and once again the rotational differential occurs. The internal pressure once again rises from this rotational differential and removal of the differential is carried out, causing the action to repeat in this way, so that this action is unstable.

SUMMARY OF THE INVENTION

A first object of the present invention is to provide, with due consideration to the drawbacks of such conventional devices, a vehicular power transmission device wherein the differential of a plurality of resistance plates, which are rotatably connected to an input shaft and an output shaft respectively, is restrained, and the heat generation in a viscous fluid is prevented, giving an increased transmission limit torque.

Another object of the present invention is to provide a vehicular power transmission device with improved durability of the seal members, and with stable operation.

In order to accomplish these objects, the vehicular power transmission device of the present invention comprises: a first member and a second member which can rotate relative to one another; a sealed chamber formed between the two members with a viscous fluid filled within the chamber; a plurality of resistance plates which can move in the axial direction, the plates mutually approaching one another in the sealed chamber and being capable of relatively rotating together with the two members; and a coupling means which removes the differential in the resistance plates during rotation.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENTS

Figure 1:
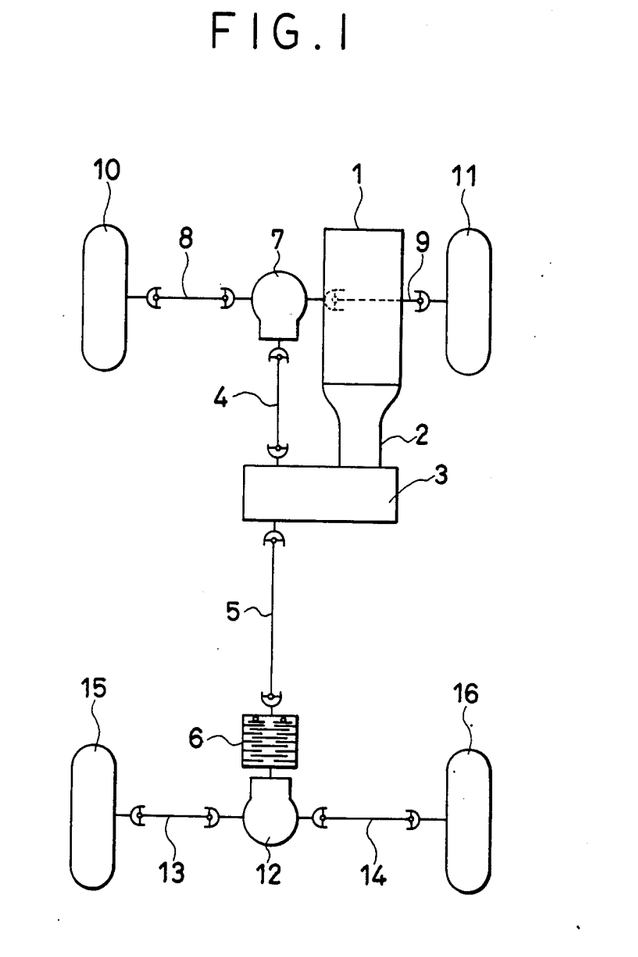
FIG. 1 is a general view showing the drive layout.
Figure 2:
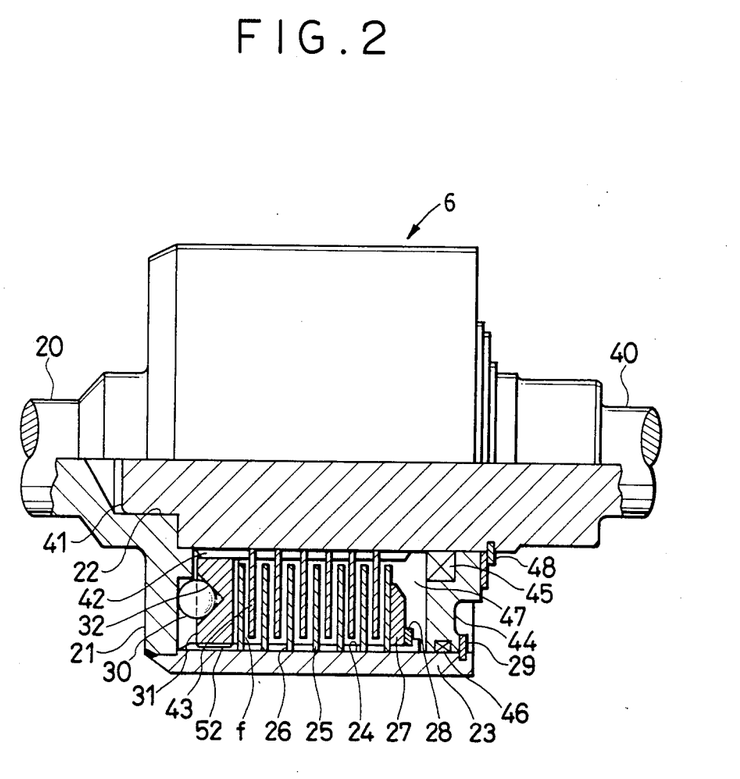
FIG. 2 is a side elevational view, partially in section showing one embodiment of a viscous clutch in accordance with the present invention.
Figure 3:
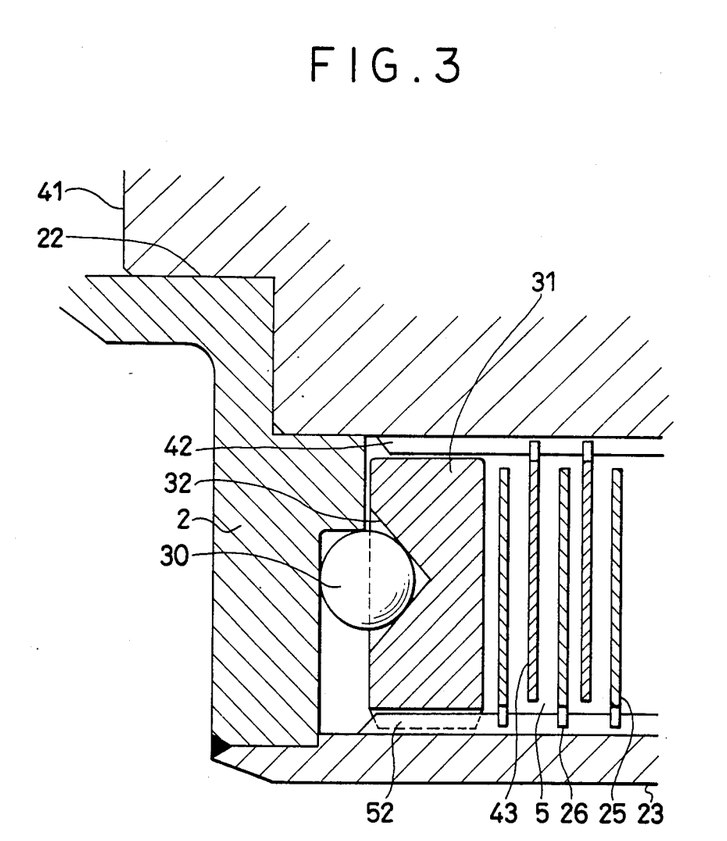
FIG. 3 is an enlarged sectional view of the main parts shown in FIG. 2.

Now referring to FIG. 1 to FIG. 3 showing a first embodiment of the present invention, FIG. 1 shows the layout of a power transmission device of a vehicle wherein a transfer means 3 is driven through a transmission means 2 by an engine 1. The power from the transfer means 3 is divided and transmitted to a plurality of front wheels 10, 11 and to a plurality of rear wheels 15, 16 of the vehicle through a propeller shaft 4 and a propeller shaft 5, respectively.

The front wheels 10, 11 are driven from the propeller shaft 4 through a left drive shaft 8 and a right drive shaft 9 through a front differential 7.

In the drive system for the rear wheels 15, 16 a viscous clutch 6 is provided as a power transmission device between the propeller shaft 5 and a rear differential 12.

The power is transmitted from the propeller shaft 5 through the viscous clutch 6 to the rear differential 12, and the rear wheels 15, 16 are driven through a left drive shaft 13 and a right drive shaft 14.

The action of the viscous clutch 6 has the characteristic of transmitting a slight torque in the case where a slight difference in rotaion is produced between the input and output shafts. However, when a large difference in RPM occurs the viscous clutch 6 will transmit an extremely large torque.

FIG. 2 is a side elevation including a part section of the details of the viscous clutch. A flange 21 is provided on one end surface of an input shaft or first member 20 (only partly shown in the drawing). A bearing hole 22 is formed in the centerline section in the axial direction centerline to support the end of an output shaft or second member 40, which will be later explained. One side of a cylindrical outer tube 23 engages the outer periphery of the flange 21, and after engaging, the two are integrally joined at the external peripheral ends. A plurality of channels 24 (for example, channels for receiving a spline) are provided parallel to the centerline on the inner circumferential surface of the cylindrical outer tube 23. A plurality of teeth 26 (for example, teeth for receiving a spline) equivalent in number to the number of channels 24, are provided on the outer peripheries of a plurality of input shaft clutch plates 25, which act as resistance plates inserted into the channels 24. These teeth 26 are slidably fitted in the channels 24 which are provided on the outer tube 23. A hollow portion with a slightly large diameter is formed in the center section of the input shaft clutch plate 25 in such a way that it does not contact the outer periphery of an output shaft 40, which will be later described.

The input shaft clutch plates 25 are mutually assembled with a plurality of output shaft clutch plates 43, which will be later explained, with a gap f therebetween. The assembly maintains the gap as set by a stopper 28 and a maintaining plate 27 which is provided at the distal edge of the assembly.

A stopper 29 for preventing the separation of the outer tube 23 of the input shaft from the output shaft 40, is mounted as a ring on the tip of the outer tube 23.

In addition, a thrust plate 31 is provided as a moving body between the flange 21 provided on the one end of the input shaft 20 and the input shaft flange plate 25. The thrust plate 31 has a plurality of steel spheres 30 maintained as weights, which is shown in FIG. 3 more clearly.

The thrust plate 31 is annular, and on its outer diameter a plurality of teeth 52 are slidably fitted into the grooves 24 on the outer tube 23. The inner diameter of the thrust plate 31 is slightly larger than the outer diameter of the output shaft 40.

The thrust plate 31 can move in the axial direction.

One side surface of the thrust plate 31 contacts the input shaft clutch plate 25, while in the other side surface, a plurality of laterally conical cavities 32 are provided in the almost dead center of the ring width as a cam means. The conical cavities open radially with an obtuse angle.

The sphere 30 is inserted and held in a non-removable manner between the inclined surfaces of the plurality of conical cavities 32 provided in the thrust plate 31 and the side surface of the flange 21 provided at one end surface of the input shaft 20.

The tip of the output shaft 40 (of which a part is omitted from the drawing) is formed with a bearing section 41, which is inserted in a freely slidable manner into the bearing hole 22 formed in the same direction as the centerline of the shaft in the center of the input shaft 20. The output shaft 40 is supported on the same centerline as the input shaft 20 by the insertion of the bearing section 41.

A plurality of channels 42 (for example, channels for receiving a spline) are provided on the outer circumferential surface of the output shaft 40, in the range corresponding to the channels 24 which are provided on the internal circumferential surface of the outer tube 23.

The output shaft clutch plate 43, which acts as a resistance plate inserted into the channel 42, is provided with a number of teeth (for example, teeth for receiving a spline) in the hollow portion in the central section equivalent in number to the number of channels 42 which are provided on the outer circumferential surface of the output shaft 40, and the outer circumferential is formed with a rather small diameter in such a way that it does not contact the inner circumferential surface of the outer tube 23 on the input shaft.

The output shaft clutch plates 43 are mutually paired with the input shaft clutch plates 25 with a gap between them.

A flange 44 is engaged with the output shaft 40 in a position corresponding to the end section of the outer tube 23 on the input shaft side, in a non-removable manner. An oil seel 45 is inserted in and attached to a part provided on the outer periphery of the output shaft 40.

The outer circumferential surface of the flange 44 is provided with an external diameter of such magnitude that it is freely slidable on the inner circumferential surface of the outer tube 23 on the input shaft side. An oil seal 46 is inserted and a stopper 48 is formed into a ring positioning on one surface of the flange 44.

A working chamber 47 is completely sealed by the oil seals 45 and 46 which are inserted into the flange 44.

The operating chamber 47 is filled with a fluid of high viscosity, so that the gap f provided between the input and output shaft clutch plates is also filled with this high viscosity fluid. This viscous fluid contains a lubricant, and may consist, for example, of molybdenum disulphide mixed with silicone oil.

The action of this embodiment of the present invention with a configuration as outlined above is as follows. The power is transmitted through the input shaft whose rotation causes the input shaft clutch plate 25 to rotate. The power is then transmitted by way of the viscous fluid contained in the gap f between the input shaft clutch plate 25 and the output shaft clutch plate 43, and the rotational power generated by sliding friction is transmitted to the output shaft clutch plate 43. The output shaft 40 then rotates, transmitting the power.

At the time this power is transmitted, the centrifugal force on the steel sphere 30, which is held between the thrust plate 31 and the input shaft flange 21, increases in proportion to the increase of the RPM of the input shaft 20 from the effect of the gravity of the sphere 30. This causes the steel sphere 30 to tend to project from the conical cavity 32 in which it is maintained, but because it is in contact with one side surface of the flange 21, it presses against the inclined surface of the conical hole 32. The component of this force becomes a thrust force in the axial direction. This causes the thrust plate 31 to move in the axial direction so that the gap f between the input and output shaft clutch plates 25, 43 is reduced, increasing the pressure on the clutch plates. At a high rate of rotation, the slippage between the clutch plates and the viscous fluid disappears, preventing the generation of heat from such slippage. This causes the boundary torque to increase.

Figure 4:
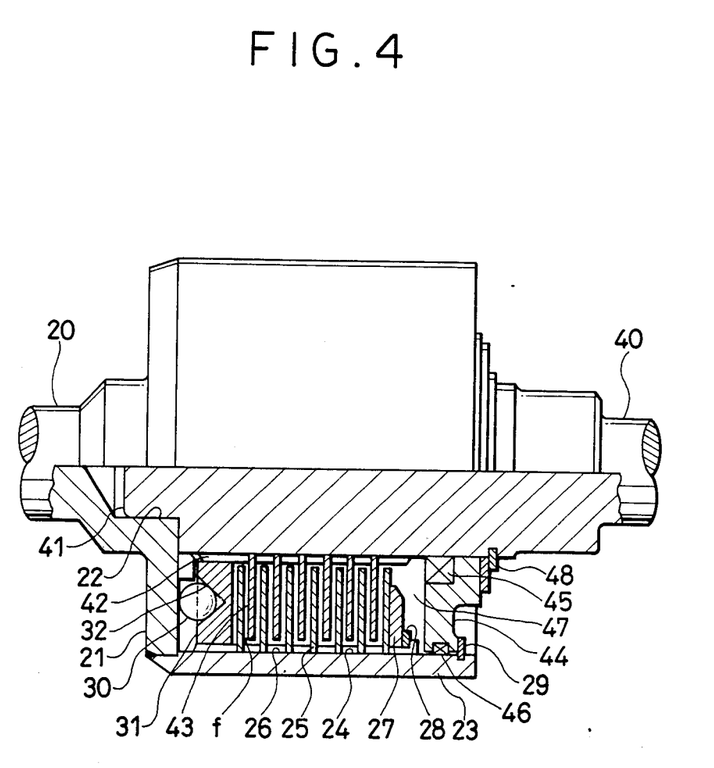
FIG. 4 is a side elevational view, partially in section, of a second embodiment of the viscous clutch of the present invention.
Figure 5:
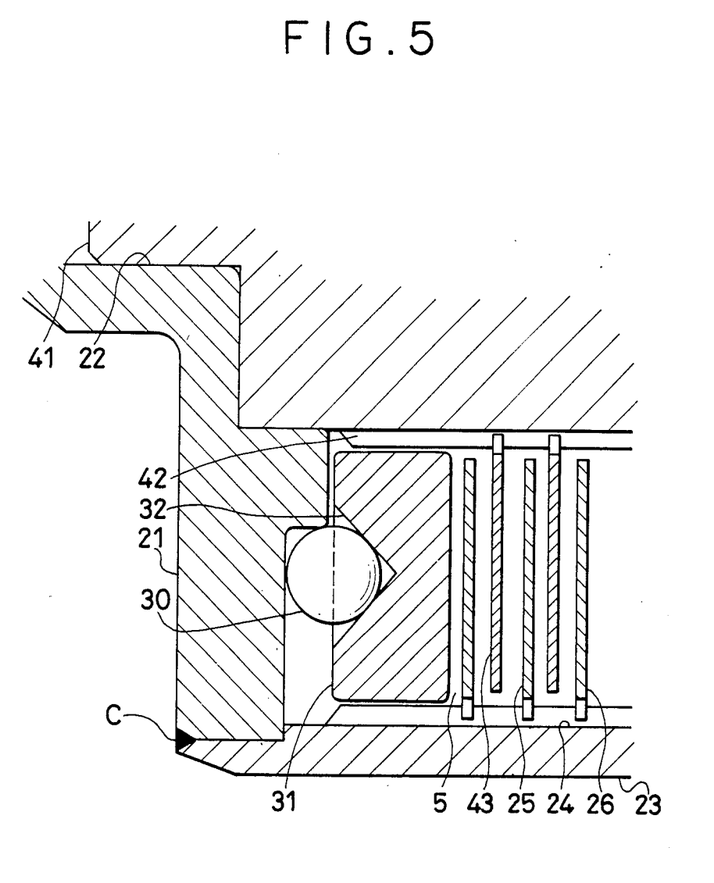
FIG. 5 is an enlarged sectional view of the main parts shown in FIG. 4.

FIG. 4 and FIG. 5 show a second embodiment of the power transmission device of the present invention. The thrust plate 31, as a moving body, does not engage the input shaft 20 and the output shaft 40. Accordingly, in this case, these two shafts are caused to rotate together from the rotation of the resistance plates 25, 43. For this reason, when the thrust plate 31 moves in the axial direction the resistance is completely reduced by the sliding effect, and the thrust plate is able to move because of the low centrifugal force. The balance parts of the second embodiment are similar to the first embodiment.

Figure 6:
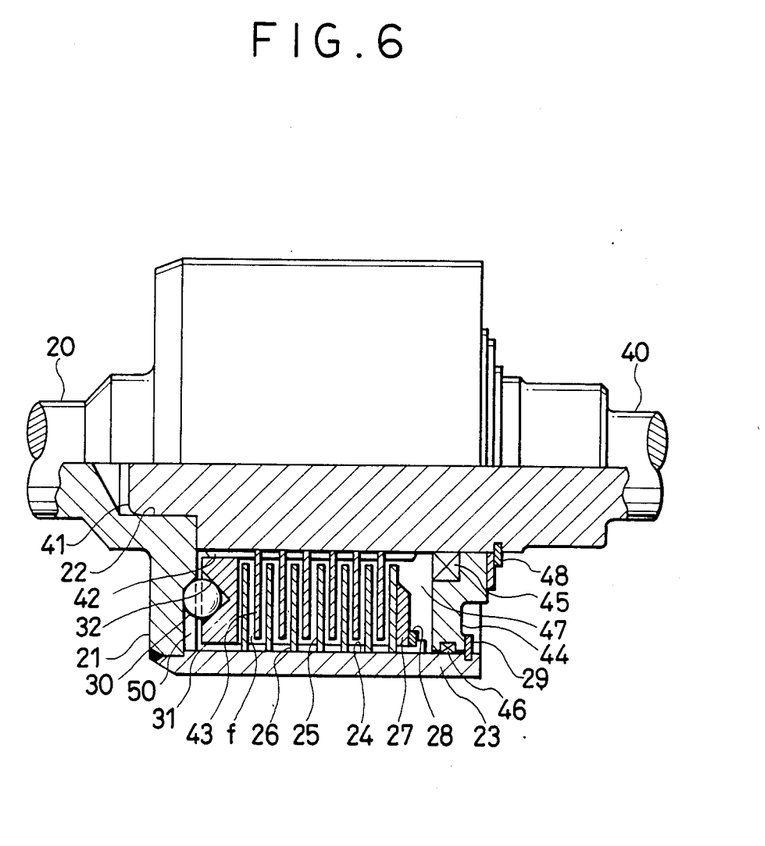
FIG. 6 is a partially sectional side elevational view of a third embodiment of the viscous clutch of the present invention.
Figure 7:
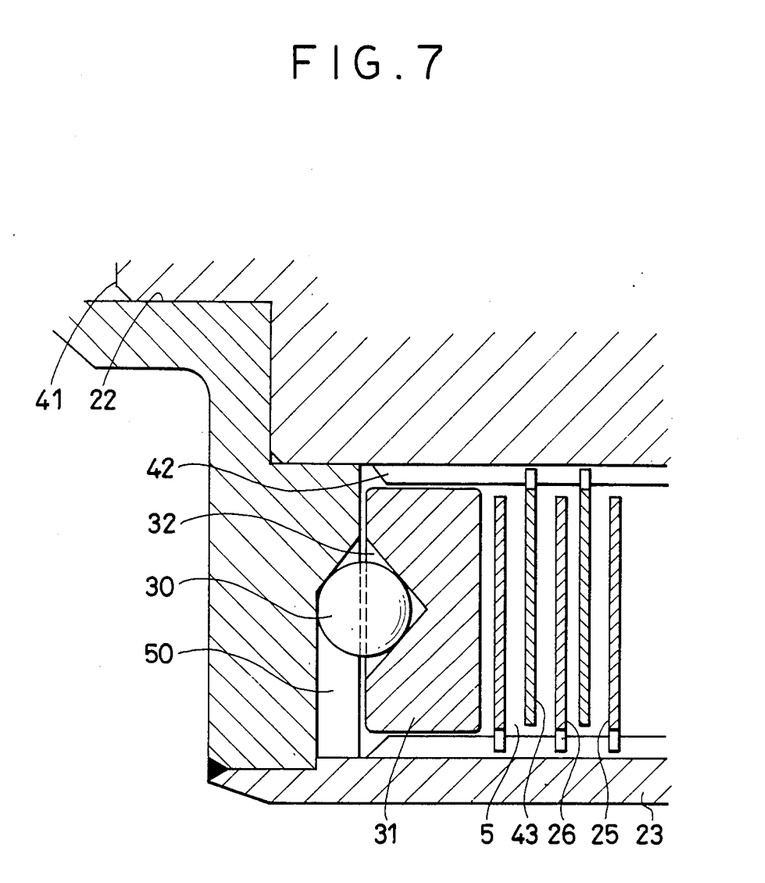
FIG. 7 is an enlarged sectional view of the main parts shown in FIG. 6.

FIG. 6 and FIG. 7 show a third embodiment of the power transmission device of the present invention. A channel 50 is provided in the flange 21 of the input shaft 20, and the steel sphere 30 is positioned in the channel 50 as a weight. In this case, in contrast to the previous embodiment of the present invention, the rotation is not transmitted to the steel sphere 30 from the thrust plate 31 as a moving body, but instead the rotation is transmitted directly from the input shaft 20, so the steel sphere 30 is able to move along the channel 50 in the radial direction from the force of gravity, and cause the thrust plate 31 to move in the axial direction. In this case, the input shaft 20 is not expected to rotate in common, and because the thrust plate 31 is not engaged through a spline, it does not receive any sliding resistance when it is moving in the axial direction so it demonstrates an even greater effect. In addition, when this embodiment of the present invention experiences sudden acceleration, the thrust plate 31 tends to maintain its existing position, and because the steel sphere rotates together with the input shaft as a result of the cam means of the steel sphere and the thrust plate, the thrust plate moves in the axial direction to contact the resistance plate and transmit a torque. For this reason, in contrast with the previous embodiment, when sudden acceleration occurs, the input shaft and the output shaft become an integrated body, and the time lag when torque is transmitted during sudden acceleration becomes small, so that torque is transmitted with good response.

Furthermore, this invention is not restricted to the foregoing embodiments. For example, it can also be used as a center differential device provided in a power splitting device for a four-wheeled drive vehicle.

When the previous embodiments of the present invention are used as a power transmission device, the resistance plate, which rotates along with the input shaft, transmits the rotational force created by sliding friction to the output shaft resistance plate, which rotates along with the output shaft, through the high viscosity fluid which is provided in the gap set between the output shaft resistance plates. This produces rotation in the output shaft, but when torque is transmitted, a continuous slip is produced between the resistance plate and the viscous fluid. In order to eliminate this slip, an axial thrust force is generated in the moving body through centrifugal force produced by the rotation of a built-in weight. Pressure is applied to both input and output shaft resistance plates, and the transmitted torque is increased by means of this pressure. Heat generation caused by the slip generated between the clutch position and the viscous fluid is restrained. Results are demonstrated in proportion to the high speed rotation, and the boundary torque is increased.

Furthermore, in the case of the configuration where the weight rotates integrally with the input shaft, pressure can also be applied to the resistance plate during sudden acceleration, so that torque can be transmitted with good response.

Next, a fourth embodiment of the present invention will be explained with reference in FIG. 8 and FIG. 9.

Figure 8:
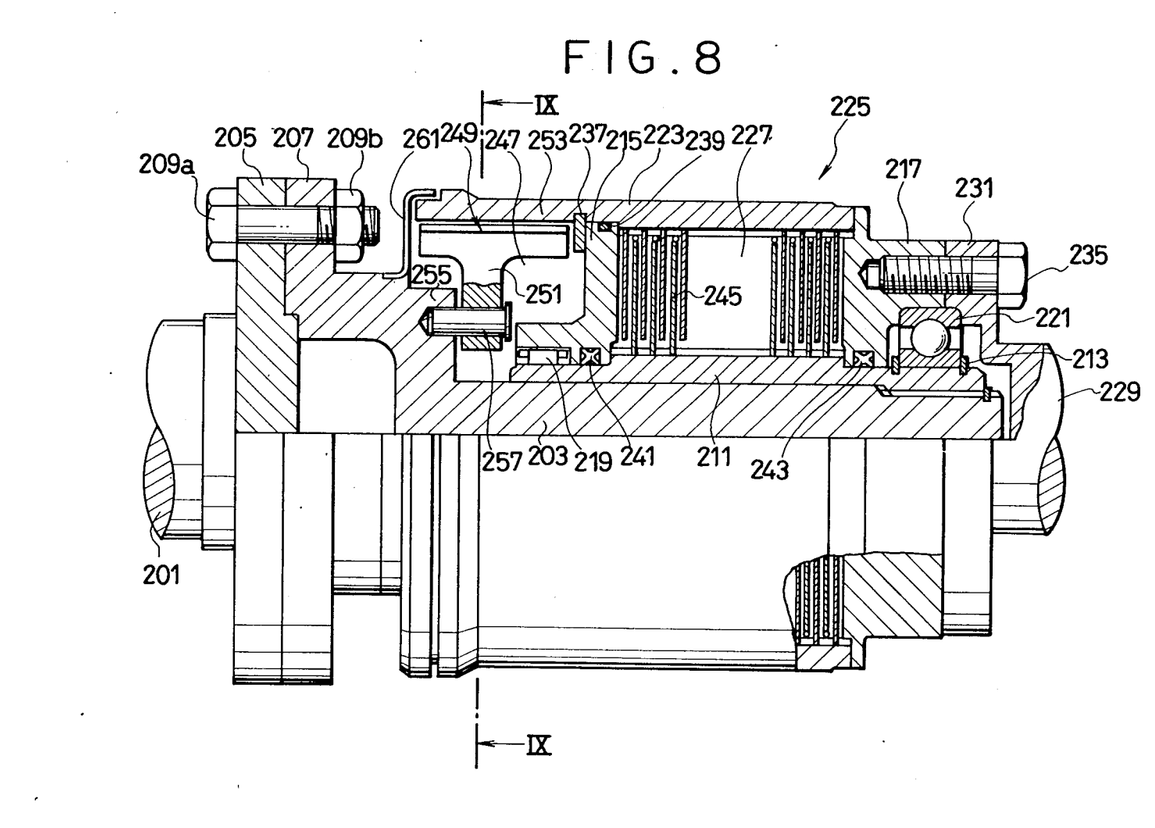
FIG. 8 is a partially sectioned side elevation of a fourth embodiment of the viscous clutch of the present invention.
Figure 9:
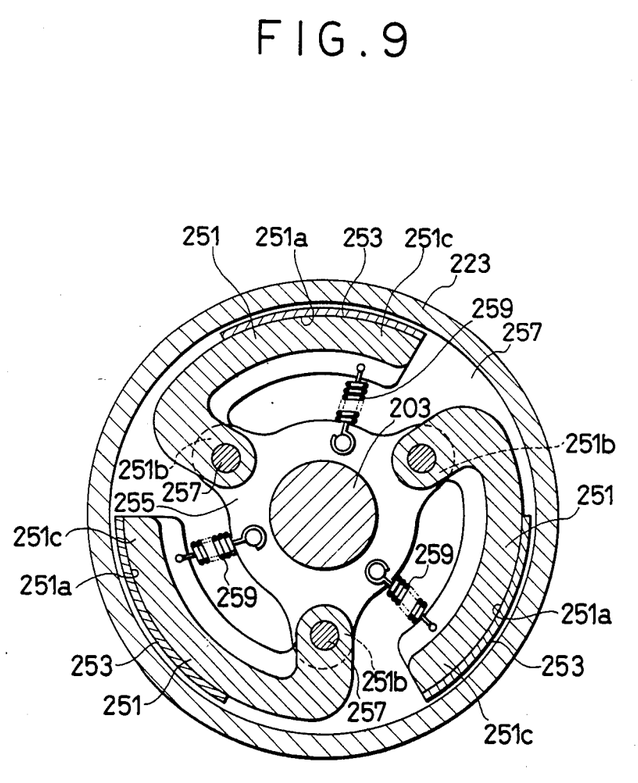
FIG. 9 is a sectional view of the main parts viewed along the line 1X - IX in FIG. 8.

FIG. 8 is a sectional view of the status of the power transmission device on a propeller shaft of a four-wheeled-drive vehicle. FIG. 9 shows a cross section viewed along the line IX—IX in FIG. 8. An input shaft 201, which is one part of a propellor shaft, and an input member 203 as a first member are positioned on the same axial line. The input shaft 201 and the input member 203 are connected by a flange 205 and a flange 207 through a plurality of bolts 209a and nuts 209b. A collar member 211 of a prescribed length engages the input member 203 by means of a spline engagement in the end section, and is secured in the axial direction by a stopper 213. An annular partition 215 and an annular member 217 are provided on the left and right ends respectively of the collar member 211, and coupled in a freely rotating manner through a needle bearing 219 and a ball bearing 221 respectively. An annular housing 223 is mounted over the left and right partitions 215, 217 to form an output member 225 with the left and right partitions 215, 217, as a second member. An annular sealed chamber 227 is formed by the provision of a plurality of seal members 239, 241, and 243 between the input shaft member 203 and the output shaft member 225. Both the input or first shaft member 203 and the output or second shaft member 225 become freely and mutually rotatable with the sealed chamber 227 therebetween. The output shaft 229, which are positioned on the same axial line with the input shaft 201, is connected by a bolt 235 at a flange 231 on the partition 217.

A plurality of resistance plates 245 are provided in the sealed chamber 227. Half of the resistance plates 245 are locked in the direction of rotation with the outer periphery of the collar member 211 of the input member 203 through a spline. The other half are locked in the direction of rotation with the inner circumferential of the housing 223 of the output member 225 through a spline. The resistance plates 25 are alternatively mounted respectively.

In addition, a viscous fluid such as silicone oil is sealed into the sealed chamber 227.

A hollow section 247 is formed on the side of the input shaft 201 of the housing 223, specifically on the front side of the partition 215. A centrifugal clutch 249 which connects and isolates the power transmission of the input member 203 and the output member 225 is provided in the hollow section 247. As shown in FIG. 9, a plurality of clutch shoes 251 (at three points in FIG. 9) are positioned at equal intervals along the inner circumferential surface of the housing 223 to form this centrifugal clutch 249, in the housing 223 which forms a clutch drum. The clutch shoes 251 have an engaging surface 251a formed on the arc of a circle which is almost concentric with the inner circumferential surface of the housing 223. A clutch lining 253, which is formed of asbestos or the like, is attached to the engaging surface 251a. The respective base section 251b of the clutch shoe 251 is supported in a freely openable manner on the flange 255 of the input member 203 with a support pin 257 as a fulcrum. A clutch spring 259 is installed between a tip section 251c and the input member 203. The clutch shoe 251 is energized in the direction of separation from the inner circumferential surface of the housing 223 (toward the center) by the clutch spring 259.

Accordingly, by suitably setting the energizing force of the clutch spring 259, the clutch shoe 251 opposes the energizing force of the clutch spring 259 with centrifugal force generated by the rotation of the input member 203, and is opened in the outer direction. The so-called clutch-in RPM, which means the engaging of the clutch lining 253 of the clutch shoe 251 with the inner circumferential surface of the housing 223, can be set.

The side of the input shaft 201 of the hollow section 247 is covered by an annular cover 261 which is mounted on the input member 203.

Next the action of the fourth embodiment of the present invention will be explained.

First, when the vehicle starts to run, the drive rotation is transmitted to the input member 203 and the collar member 211 from the input shaft 201. The resistance plates in the sealed chamber 227, which engage the collar member 211, are caused to turn, causing the rotation by viscous resistance of the resistance plates which engage the housing 223. The drive rotation is transmitted to the output member 217.

Then, when high speed running or poor road conditions occur, and it is impossible to escape, the drive rotation of the input member 203 speeds up, and the clutch shoes 251 which are supported at the support pin 257 in the input member 20, are opened up by centrifugal force with the support pin 257 as a fulcrum, and engage the coupling 223. The drive rotation is transmitted from the input member 203 to the output member 217 through the centrifugal clutch 249. In this way, no rotational differential between the input member 203 to the output member 217 occurs, and there is no pressure increased in the sealed chamber 227. Therefore, when the clutch-in RPM of the centrifugal clutch 249, is set at an RPM at which a pressure increase occurs in the sealed chamber 227 through the differential rotation of the viscous coupling, the power is transmitted during normal cornering, for example, through the viscous resistance of the viscous coupling, so that it is possible to run while absorbing the rotational differential produced between the front and rear axles during low speed operation, because the centrifugal clutch 249 is not operated. Accordingly, the so-called tight corner braking phenomenon developed e.g. when entering the garage can be prevented.

In addition, when the input shaft 201 reaches a prescribed RPM, the centrifugal clutch 249 is put into clutch-in, and the input member 203 and the output member 225 are directly connected to provide stable running. Accordingly, it is not necessary to maintain pressure in the housing 223, and, along with stable operation, the durability of the seal members 241, 243 and the like can be increased.

Figure 10:
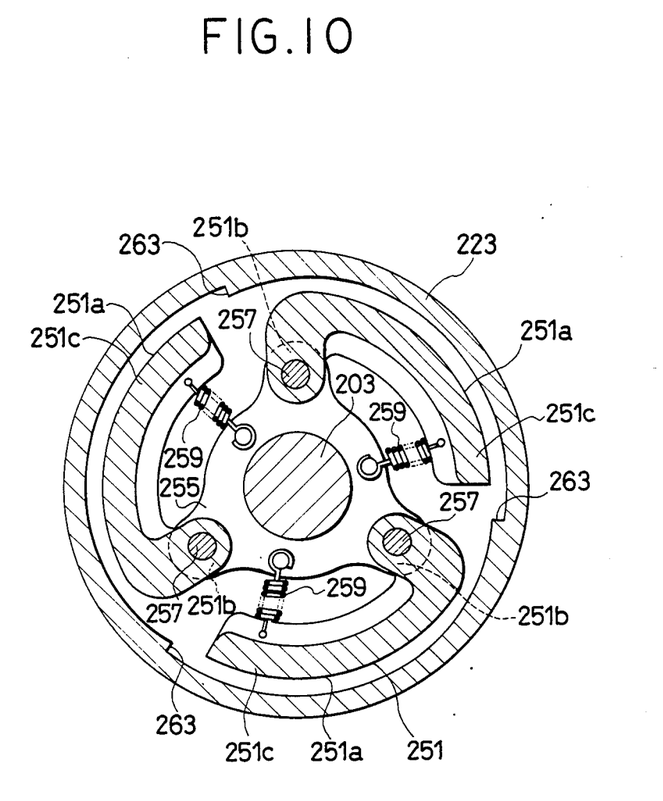
FIG. 10 is a sectional view similar to FIG. 9 showing the main parts of a fifth embodiment of the present invention.

FIG. 10 shows a fifth embodiment of the power transmission device of the present invention. A lock pawl 263 is provided on the inner circumferential surface of the housing 223, corresponding to the clutch shoe 251. Because this embodiment can be locked by means of the lock pawl 263, the torque can be reliably transmitted. The balance of the configuration is almost identical to that of the previous embodiment, so a detailed explanation is omitted here.

The present invention is not restricted to the embodiments explained above. For example, by constructing the centrifugal clutch as a two-way clutch, it is also possible to lock it in reverse.

An explanation was previously made on the use of these embodiments as a power transmission device for a four-wheeled vehicle. They can also be applied as a differential limiting device making use of viscous resistance.

In the fourth and fifth embodiments of the power transmission device of the present invention, the pressure used in the seal member positioned between those two members is lowered, making it possible to increase the durability because it is possible to directly connect the first member and the pressure increases in the sealed chamber. Furthermore, because the connection is made by means of the centrifugal clutch, the reliability is different from a device in which contact is made by use of a piston which utilizes the pressure increase resulting from increasd temperature, as in a conventional device, so stable operation is possible.

What is claimed is:

1. A hydraulic power transmission device with a centrifugally actuated clutch override, comprising:

first and second coaxially arranged independently rotatable shaft assemblies, said shaft assemblies being provided respectively with first and second wall members defining a chamber adapted to contain a viscous fluid;

first and second mutually spaced discs alternately arranged in said chamber, said first and second discs being respectively connected to and rotatable with said first and second shaft assemblies, with the viscous resistance of the fluid in said chamber providing a rotational driving connection between said first and second discs and their respective shaft assemblies; and clutch means arranged between said shaft assemblies, said clutch means including at least one clutch member carried on said first shaft assembly at a location surrounded by a circumferential surface on said second shaft assembly, said clutch member being movable radially outwardly into engagement with said circumferential surface in response to centrifugal forces developed during rotation of said first shaft assembly above a selected angular velocity, thereby establishing a rotational driving connection between said first and second shaft assemblies which overrides the rotational driving connection derived from the viscous resistance of the fluid in said chamber.

2. The power transmission device of claim 1 further comprising means for biasing said clutch member radially inwardly towards the axis of rotation of said first shaft assembly.

3. The power transmission device of claim 1 wherein said clutch member is pivotally mounted to said first shaft assembly.

4. The power transmission device of claim 1 wherein said clutch member is frictionally engageable with said circumferential surface.

5. The power transmission device of claim 1 wherein said circumferential surface is provided with at least one locking pawl arranged to be mechanically engaged by said clutch member.

* * * * *